United States Patent Office 2,733,335
Patented Jan. 31, 1956

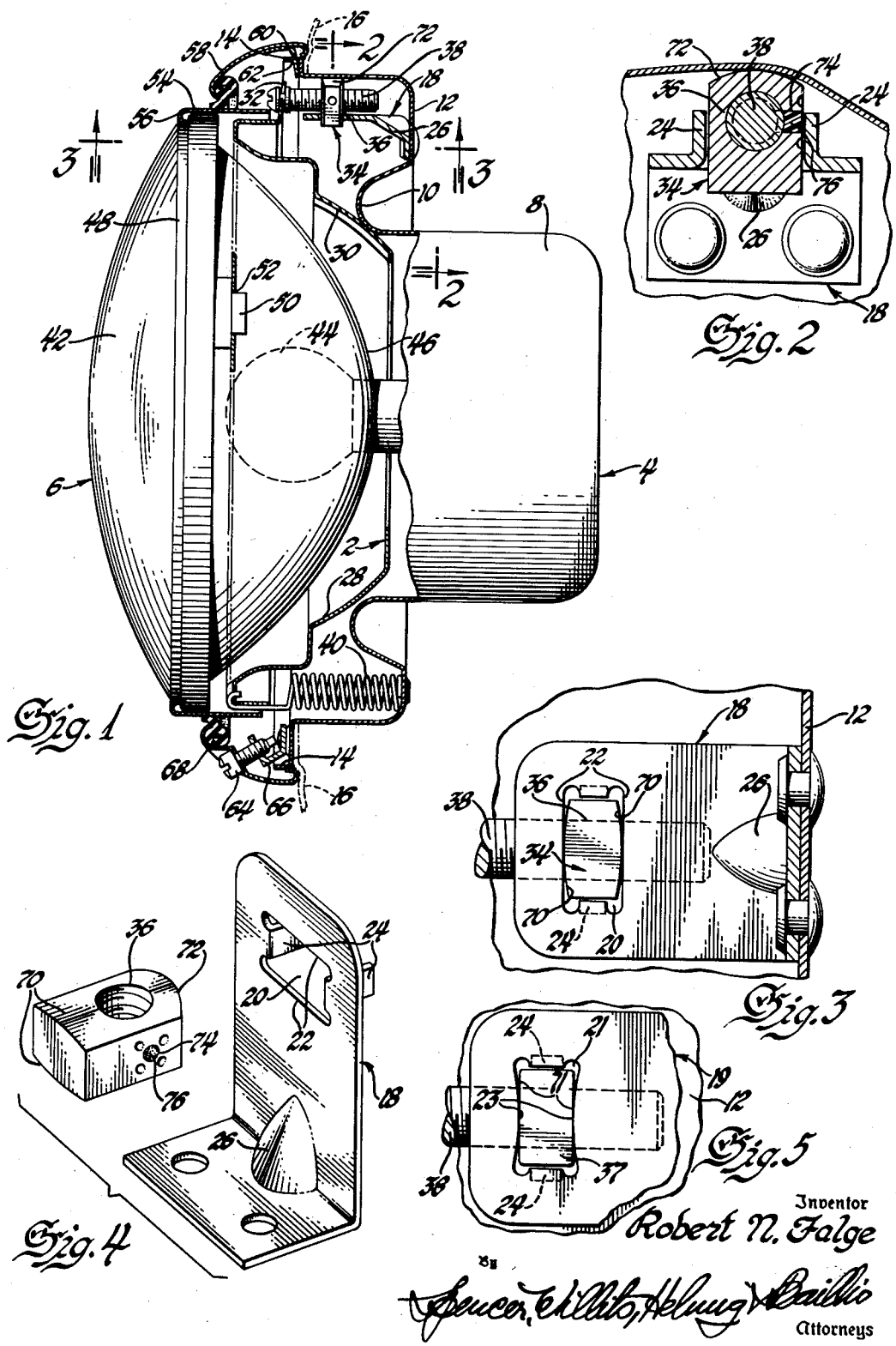

2,733,335

HEADLAMP ADJUSTING DEVICE

Robert N. Falge, Anderson, Ind., assignor to General Motors Corporation, Detroit, Mich., a corporation of Delaware Application May 19, 1949, Serial No. 94,098

3 Claims. (Cl. 240—41)

The present invention relates to mounting devices for securing automobile headlamp units consisting of a reflector, lens and light source in various adjusted positions and more particularly to fastening means for adjustably securing the relatively movable elements of such devices.

Lamp units commonly used in automobile headlamps at the present time comprise a reflector, lens and light source sealed as a unit to prevent the entrance of dust and moisture which reduces the efficiency of the reflector. Such units are commonly referred to as sealed-beam lamps or package lamps.

In the mounting of such units for use in automobiles it is necessary to provide for the angular adjustment of the optical axis of the unit both vertically and horizontally to permit proper aiming of the unit. In one form of mounting device commonly used on automobiles at the present time, vertical and horizontal adjustment of the lamp units optical axis is obtained by employing a ball and socket type of universal joint. In this form of mounting device, the lamp unit itself or in combination with a member in which it is mounted constitutes the ball assembly of the joint and is adjustably secured in a socket fixed in an aperture in the body or fender structure. While a single spring may be sufficient, generally a plurality of springs connect the peripheral edges of the ball and socket members at spaced points and cooperate with adjustable fastening means connecting the peripheral edges of the ball and socket members at points substantially diametrically opposite from the springs to provide for adjusting the lamp unit to obtain proper aiming. Heretofore, fasteners commonly employed in securing relative adjustment of the ball and socket members have consisted of an externally threaded member having a turning head rotatably secured in the peripheral edge of the ball member and threaded in an internally threaded member fixedly attached to the socket member. To obtain angular adjustment of the optical axis of the lamp unit both vertically and horizontally a pair of fasteners has generally been employed, one disposed to connect the ball and socket members in a vertical plane through the longitudinal axis of the mounting device and the other disposed in a horizontal plane through the axis for connecting the members. With this form of fastener and arrangement for adjustably securing the ball and socket member, adjustment of one of the fasteners without simultaneous adjustment of the cooperating fastener would induce a lateral shifting of the turning head of the cooperating fastener introducing a bending stress in the fastener which would be transmitted to the connected parts of the ball and socket joint. Such a stressed condition made it difficult to obtain optimum aiming and in many instances would loosen the internally threaded member making it difficult to obtain substantially permanent satisfactory aiming of the lamp.

Accordingly, it is an object of the present invention to provide a mounting device of the ball and socket type in which relative adjustment of the ball and socket members is obtained by a fastener adapted for connection to the socket member for universal rocking movement therein. It is a further object to provide an adjustable fastener of the threaded type having improved means for securing frictional engagement of the threadedly engaging parts.

These and other objects are obtained in accordance with the present invention by providing a mounting device of the ball and socket type with a fastener having means adapting it to be secured to the socket member for universal rocking movement therein. Suitable frictional engagement between the threadedly engaged parts of the fastener is obtained by providing the internally threaded member with an integral friction element such as nylon.

Other object and advantages of my invention will become apparent as the following description proceeds and the features of novelty which characterize my invention will be pointed out with particularity in the claims annexed to and forming a part of this specification.

For a better understanding of the invention reference may be had to the accompanying drawing in which Figure 1 is a side elevational view partly broken away of an automobile headlamp mounting device of the ball and socket type embodying the present invention; Figure 2 is a view taken along line 2—2 of Figure 1; Figure 3 is a view taken along the line 3—3 of Figure 1; Figure 4 is a perspective view of one form of frictional member of the fastener and its supporting bracket and Figure 5 is a fragmentary view similar to Figure 3 illustrating a modification of the invention.

Referring now to the drawing there is illustrated a device for mounting lamp units in automobiles to provide for angular adjustment of the optical axis of the unit comprising relatively movable ball and socket members 2 and 4 respectively in which a lamp unit 6 of the sealed-beam lamp type is secured.

The socket member 4 is a metal stamping consisting of a central cup-shaped portion 8 having a rolled brim 10 surrounded by an angular channel 12 and an axially extending annular flange 14. The socket member is secured by any suitable means in a lamp support 16 such as a headlamp housing or in a fender or body panel apertured to receive the stamping as is the practice at the present time. Within the channel 12 at one side and at the top, shown in section detail in Figure 1, there is secured a generally L-shaped bracket member 18 provided with an aperture 20 having parallel sides 22 and outwardly turned tangs 24. To stiffen the bracket, it is formed with a depression or rib 26 at its right angle junction.

Within the socket member 4 there is seated the ball member 2 which is also a metal stamping provided with a generally spherically shaped portion 28 having outwardly pressed ribs 30 for engaging the rolled brim 10 to form a universal joint with substantially a minimum of frictionally engaging surfaces. To secure the ball member 2 in its seated position, it is provided with an irregular peripheral flange 32 which at the side and top opposite the brackets 18 is slotted to receive the turning heads of the fasteners 34 comprising the internally threaded member 36 positioned in aperture 20 of bracket 18 and the externally threaded member 38; the top fastener being shown in section detail in Figure 1. As shown the turning head of member 38 is circumferentially grooved to recess the turning head in the slots of the peripheral flange 32 for relative rotary movement therein. In addition to being secured by fasteners 34 the ball member is secured by spring means connecting the peripheral edge from which flange 32 projects to channel 12. In the case of a single spring, the connection between flange 32 and channel 12 would be made at a point diametrically opposite a point midway between the fasteners 34. In the case of a connection comprising a pair of springs, the springs are connected between the flange 32 and channel 12 at points substantially opposite the fasteners. The bottom spring 40 of such a connection is shown in section detail in Figure 1.

A sealed beam lamp unit 6 comprising the lens 42, lamp bulb 44, reflector 46 and sealing ring 48 is seated within the ball member 2. To provide means for accurately positioning this type of lamp unit in the mounting device the sealing ring is formed with unequally spaced stepped lugs 50 which cooperate with slots 52 in the ball member 2. The lamp unit is secured in the ball member by a retaining ring 54 having an inwardly turned end 56 for engaging the sealing ring 48 and an outturned flange, not shown, provided with any suitable means such as threaded screws for detachably securing the retaining ring to the peripheral flange 32 of the ball member 2.

Suitable means such as the bezel 58 is provided to give a finished appearance to the front of the lamp and conceal the fastening means. Bezel 58 is provided at the top with a tang 60 which engages an aperture 62 in the axial flange 14 and at the bottom with a threaded fastener 64 in threaded engagement with a stamping 66 secured to the outer radial flange of the cup-shaped member 4. The end edges of the bezel are inturned providing a channel at its outer end in which there is secured a rubber sealing gasket 68.

With the parts assembled it will be apparent that to adjust the aim of the lamp unit 6 it is necessary to first remove the bezel 58 by unscrewing fastener 64. Thereafter the vertical aim may be adjusted by turning the upper aiming screw 38 and the horizontal aim may be adjusted by turning a side aiming screw (not shown) of the same construction as screw 38. Adjustment is resisted by the springs 40 which continually urge the lower portion of the peripheral flange 32 toward channel 12 and the ball member 2, into the socket member 4.

With such an arrangement for obtaining horizontal and vertical shifting of the optical axis of the lamp unit it is desirable to provide means permitting universal rocking movement of the fasteners during adjustment so that there will be no binding of relatively movable parts. Further, with the unit properly aimed it is desirable that the fastener be provided with means for effecting a frictional engagement between the threads of the fastener members which resists relative rotational movement of the members under forces acting thereon due to shock and vibration that are ordinarily encountered in service.

To provide universal rocking movement for the fasteners 34, the member 36 is slidably positioned in aperture 20 between guiding tangs 24 and is formed with arcuate end surfaces 70 which permit the member to rock on the parallel sides 22. The tangs 24 in addition to serving as guides resist any turning movement of member 36 caused by rotation of the member 38. One side 72 of member 36 is curved, as shown, to fit the member in the space between the bracket and the channel 12 with sufficient space to permit the threading of member 38 into it. When member 38 is threaded into member 36 it also provides a stop against the bracket 18 for holding member 36 in aperture 20.

Another form of fastener and bracket permitting universal rocking movement of the fastener in the bracket is illustrated in Figure 5 wherein an aperture 21 is provided in a bracket 19 similar to bracket 18 with curved side faces 23. With this type of bracket a fastener is employed having an internally threaded member 37 with straight sides 71.

To provide for the frictional engagement of members 36 and 38 of fastener 34, member 36 is provided with a transverse hole 74 communicating with the threaded bore in which a frictional element 76 is positioned and secured by any suitable means as for example peening the edge of the hole. A particularly desirable material for the frictional element is the polyamide commonly known as "nylon" comprising the copolymers of adipic acid and hexamethylene-di-amine. A frictional element of such material has good dimensional stability under varying conditions of humidity and the desirable characteristics of elastic recovery. Further, its locking characteristics would not be affected by temperature conditions in which an automobile normally operates. With a frictional element of such a material, the threads of member 38 when it is turned into member 36 engage the exposed surface of the element and the material forms around the threads providing a stable frictionally engaging surface which resists relative rotational movement of the threaded members under conditions due to shock and vibration. In addition, the action of the element draws the threads of the engaging members together to take up thread variations in the respective members.

Internally threaded members similar in form to 36 and 37 but made entirely of "nylon" may also be employed advantageously to obtain universal rocking movement in the bracket members providing at the same time frictional resistance to rotation of the externally threaded member of the fastener.

While the embodiments of the present invention as herein disclosed, constitute preferred forms, it is to be understood that other forms might be adopted, all coming within the scope of the claims which follow.

What I claim and desire to secure by Letters Patent of the United States is:

1. The combination of a lighting unit comprising a reflector, lens and light source within the reflector and a mounting therefore comprising a cup-shaped ball member extending over the reflector, said member being provided with an annular flange and a spherical seating surface with its center of curvature substantially on the reflector axis, means for securing said lighting unit to said ball member, a socket member for supporting the ball member, said socket member having a rolled brim forming an annular seat for engagement with the seating surface of the ball member to provide a universal joint and an annular channel extending from said brim, a plurality of brackets secured at circumferentially spaced points in said channel each of said brackets having a single aperture formed therein, adjustable fasteners connected between said flange and said brackets, each of said fasteners comprising an internally threaded member having an arcuately shaped end surface in engagement with said apertured bracket for rocking movement therewith, and an externally threaded member threadedly engaging said internally threaded member and having a turning head rotatably secured in said flange, said internally threaded member being formed at least in part of a copolymer of adipic acid and hexamethylene-di-amine, yielding means connecting said ball and socket members and urging said ball and socket members into engagement, and means positioned adjacent said internally threaded member for restraining rotary movement of said member about its thread axis.

2. In a device for adjustably securing automobile headlamp units comprising a lens, reflector and light source, said device including universally joined ball and socket members yieldingly urged into engagement by spring means, an adjustable fastener for effecting relative movement of and securing said ball and socket members in various adjusted positions, said fastener consisting of a bracket having an aperture therein and secured to said socket member, an internally threaded element recessed in said aperture and having an arcuately shaped end surface in engagement with said bracket to provide rocking movement therewith in planes parallel with and transverse to the plane of said bracket, means in said element for effecting a frictional engagement between the surfaces of the thread thereof and the thread of an externally threaded element entered in the internally threaded element, said externally threaded element having a turning head rotatably secured in the ball member, and means positioned adjacent said internally threaded member for restraining rotary movement of said member about its thread axis.

3. In a device for adjustably securing automobile headlamp units comprising a lens, reflector and light source, said device including universally joined ball and socket members yieldingly urged into engagement by spring means, an adjustable fastener for effecting relative movement of and securing said ball and socket members in various adjusted positions, said fastener consisting of a bracket having an aperture therein and secured to said socket member, an internally threaded element recessed in said aperture and having an end surface in engagement with an arcuately shaped surface of said bracket to provide rocking movement therewith in planes parallel with and transverse to the plane of said bracket, means in said element for effecting a frictional engagement between the surfaces of the thread thereof and the thread of an externally threaded element entered in the internally threaded element, said externally threaded element having a turning head rotatably secured in the ball member, and means positioned adjacent said internally threaded member for restraining rotary movement of said member about its thread axis.

References Cited in the file of this patent

UNITED STATES PATENTS

| Number | Name | Date |
|---|---|---|
| 240,892 | Courtenay | May 3, 1881 |
| 967,436 | Ramsey | Aug. 16, 1910 |
| 990,732 | Harper | Apr. 25, 1911 |
| 1,135,612 | Platt | Apr. 13, 1915 |
| 1,447,658 | Harvozinski et al. | Mar. 6, 1923 |
| 1,589,142 | Godley | June 15, 1926 |
| 1,640,433 | Weldon | Aug. 30, 1927 |
| 2,040,374 | Grimes | May 12, 1936 |
| 2,218,807 | Breer et al. | Oct. 22, 1940 |
| 2,246,808 | McKechnie | June 24, 1941 |
| 2,266,329 | Mead et al. | Dec. 16, 1941 |
| 2,304,311 | Luce | Dec. 8, 1942 |
| 2,409,209 | Johnson | Oct. 15, 1946 |
| 2,434,516 | Persons et al. | Jan. 13, 1948 |
| 2,443,752 | Tinnerman | June 22, 1948 |
| 2,462,603 | Boots | Feb. 22, 1949 |